United States Patent
Averill et al.

(10) Patent No.: US 7,788,452 B2
(45) Date of Patent: Aug. 31, 2010

(54) METHOD AND APPARATUS FOR TRACKING CACHED ADDRESSES FOR MAINTAINING CACHE COHERENCY IN A COMPUTER SYSTEM HAVING MULTIPLE CACHES

(75) Inventors: Duane Arlyn Averill, Rochester, MN (US); Russell Dean Hoover, Rochester, MN (US); David Alan Shedivy, Rochester, MN (US); Martha Ellen Voytovich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1552 days.

(21) Appl. No.: 10/760,431

(22) Filed: Jan. 20, 2004

(65) Prior Publication Data

US 2005/0160226 A1    Jul. 21, 2005

(51) Int. Cl.
  *G06F 13/00*  (2006.01)
  *G06F 15/76*  (2006.01)
(52) U.S. Cl. ................... 711/141; 711/119; 712/28
(58) Field of Classification Search ............... None
  See application file for complete search history.

(56) References Cited

U.S. PATENT DOCUMENTS

| | | | |
|---|---|---|---|
| 5,951,657 A | 9/1999 | Wood et al. | |
| 6,108,764 A * | 8/2000 | Baumgartner et al. | 712/28 |
| 6,115,804 A * | 9/2000 | Carpenter et al. | 712/28 |
| 6,141,692 A * | 10/2000 | Loewenstein et al. | 709/234 |
| 6,374,331 B1 | 4/2002 | Janakiraman et al. | |
| 6,574,708 B2 | 6/2003 | Hayter et al. | |
| 2002/0174299 A1 | 11/2002 | Hayter et al. | |
| 2003/0009643 A1 * | 1/2003 | Arimilli et al. | 711/155 |
| 2003/0191894 A1 | 10/2003 | Hayter et al. | |

* cited by examiner

*Primary Examiner*—Mardochee Chery
(74) *Attorney, Agent, or Firm*—Roy W. Truelson

(57) ABSTRACT

A computer system includes multiple caches and a cache line state directory structure, having at least a portion dedicated to a particular device cache within a particular device, and contains a fixed number of entries having a one-to-one correspondence to the cache lines of the cache to which it corresponds. The cache line state directory is used to determine whether it is necessary to send an invalidation message to the device cache. In the preferred embodiment, a dedicated portion of the cache line state directory structure corresponds to an I/O bridge device cache. Preferably, the cache line state directory also maintains state for one or more processor caches in a different format. The computer system preferably uses a NUMA architecture, the directories being maintained by node servers in each node.

17 Claims, 9 Drawing Sheets

METHOD AND APPARATUS FOR TRACKING CACHED ADDRESSES FOR MAINTAINING CACHE COHERENCY IN A COMPUTER SYSTEM HAVING MULTIPLE CACHES

FIELD OF THE INVENTION

The present invention relates to digital data processing hardware, and in particular to the design and operation of mechanisms for enforcing cache coherency in a digital data processing device having multiple caches.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPUs) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant clock speed improvements by shrinking and combining components, eventually packaging the entire processor as an integrated circuit on a single chip. In addition to increasing clock speeds, many design improvements to processors have made it possible to increase the throughput of an individual CPU by increasing the average number of operations executed per clock cycle within each processor.

Independently of all the improvements to the individual processor, it is further possible to increase system throughput by using multiple processors. The modest cost of individual processors packaged on integrated circuit chips has made this approach practical, and integrated circuit technology has even progressed to the point where it is possible to construct multiple processors on a single integrated circuit chip. However, one does not simply double a system's throughput by going from one processor to two. The introduction of multiple processors to a system creates numerous architectural problems. Each processor puts additional demands on the other components of the system such as storage, I/O, memory, and particularly, the communications buses that connect various components. As more processors are introduced, these architectural issues become increasingly complex, scalability becomes more difficult, and there is greater likelihood that processors will spend significant time waiting for some resource being used by another processor.

All of these issues and more are known by system designers, and have been addressed in one form or another. While perfect solutions are not available, improvements in this field continue to be made.

One architectural approach that has gained some favor in recent years is the design of computer systems having discrete nodes of processors and associated memory, also known as distributed shared memory computer systems or non-uniform memory access (NUMA) computer systems. In a conventional symmetrical multi-processor system, main memory is designed as a single large data storage entity, which is equally accessible to all CPUs in the system. As the number of CPUs increases, there are greater bottlenecks in the buses and accessing mechanisms to such main memory. A NUMA system addresses this problem by dividing main memory into discrete subsets, each of which is physically associated with a respective CPU, or more typically, a respective group of CPUs. A subset of memory and associated CPUs and other hardware is sometimes called a "node". A node typically has an internal memory bus providing direct access from a CPU to a local memory within the node. Indirect mechanisms, which are slower, exist to access memory across node boundaries. Thus, while any CPU can still access any arbitrary memory location, a CPU can access addresses in its own node faster than it can access addresses outside its node (hence, the term "non-uniform memory access"). By limiting the number of devices on the internal memory bus of a node, bus arbitration mechanisms and bus traffic can be held to manageable levels even in a system having a large number of CPUs, since most of these CPUs will be in different nodes. From a hardware standpoint, this means that a NUMA system architecture has the potential advantage of increased scalability.

A typical computer system can store a vast amount of data, and a CPU may be called upon to use any part of this data. The devices typically used for storing mass data (e.g., rotating magnetic hard disk drive storage units) require relatively long latency time to access data stored thereon. If a processor were to access data directly from such a mass storage device every time it performed an operation, it would spend nearly all of its time waiting for the storage device to return the data, and its throughput would be very low indeed. As a result, computer systems store data in a hierarchy of memory or storage devices, each succeeding level having faster access, but storing less data. At the lowest level is the mass storage unit or units, which store all the data on relatively slow devices. Moving up the hierarchy is a main memory, which is generally semiconductor memory. Main memory has a much smaller data capacity than the storage units, but a much faster access. Higher still are caches, which may be at a single level, or multiple levels (level 1 being the highest), of the hierarchy. Caches are also semiconductor memory, but are faster than main memory, and again have a smaller data capacity. Relatively small units of data from memory, called "cache lines", are stored in cache when needed and deleted when not needed, according to any of various algorithms. In a multi-processor system, cache memory is typically associated with particular processors or groups of processors. For example, a level 1 cache is usually physically constructed on the same integrated circuit chip as the processor, and is used only by a single processor. A lower level cache might be used by a single processor, or shared by a subset of the processors on the system.

Where a computer system contains multiple processors, whether of a NUMA architecture or some other form of multi-processor design, an issue of cache coherency arises. Cache coherency refers to the fact that multiple copies of the same data may exist simultaneously in different caches, associated with different processors or groups of processors. If multiple processors were to alter different copies of the same data stored in different caches, there would be a possibility of data corruption. Accordingly, multi-processor systems employ cache coherency techniques to prevent this from happening. Conventional cache coherency techniques involve the association of a respective coherency state with each cache line in a cache. For example, data may be in a "shared" state, meaning copies of the data may exist elsewhere, or in an "exclusive" state, meaning no other copies are permitted. If data in a "shared" state is altered, then all other copies of the same data in other caches are changed to an "invalid" state, indicating that the copy is no longer reliable, and can not be saved to main memory or storage. Additional states may be defined.

When cached data in a "shared" state is altered, some technique must exist for invalidating other copies of the same data in other caches. In some designs, an invalidation message is simply broadcast to all other caches, allowing appropriate hardware at the receiving end to determine whether any action is required. This simple approach may be appropriate for certain architectures, but it will be observed that in many cases no other copies of the data will exist. Broadcasting therefore causes a large number of unnecessary invalidation messages to be sent. For many computer architectures, and particularly NUMA architectures, it is undesirable to clog the available hardware communications channels with a large number of invalidation messages.

In order to reduce the number of invalidation messages, the system may maintain one or more directories of cache line state information. Particularly, in a NUMA system, each node may contain one or more directories storing cache information for local caches as well as remote caches. I.e., a remote directory lists those cache lines which are stored in caches of other nodes, and state information for those cache lines. In order to avoid duplicating information and have a single point of reference, the remote directory in each node lists only those cache lines which are contained in main memory associated with the node. Conventionally, such directories are arranged as set-associative indexes. The associativity of such a directory must be sufficiently large to accommodate the combined capacity of the caches. I.e., the index must be sufficiently large that there will be available space for an index entry any time data from the node is stored in a cache.

Cache lines are constantly being moved in and out of caches. For many system architectures, it is impractical to keep track of all cache activity in such a directory. In particular, in a NUMA architecture, it is generally impractical for a given node to keep track of all the cache activity taking place in other nodes. If a cache line from a node's memory is stored in a remote cache, the node will not receive any notification when the cache line is removed from the remote cache. As a result, information in the remote cache directory of a NUMA node is overly inclusive. I.e., in typical operation, the remote cache directory contains a large number of entries for cache lines which have already been deleted from or invalidated in remote caches. The consequence of these extraneous entries is that unnecessary invalidation messages are often sent. Unnecessary invalidation messages will not corrupt system data, but they will reduce performance. It would be desirable to have more accurate information in the directory to reduce or eliminate these unnecessary invalidation messages, but transmitting messages to track all the cache activity, and particularly transmitting inter-nodal messages in a NUMA system, would generate more communications traffic than it would eliminate. A need therefore exists for improved techniques to reduce unnecessary bus traffic, and in particular to reduce unnecessary cache line invalidation messages.

SUMMARY OF THE INVENTION

A computer system includes a main memory, at least one processor, multiple caches, and a cache line state directory structure. The cache line state directory structure includes at least one portion dedicated to a particular device cache within a particular device, and containing a fixed number of entries having a one-to-one correspondence to the cache lines of the device cache to which it corresponds. The cache line state directory is used to determine whether it is necessary to send an invalidation message to the device cache.

In the preferred embodiment, the dedicated portion of the cache line state directory structure corresponds to an I/O bridge cache, for caching data passing through an I/O bridge device, it being understood that the particular device could be something other than an I/O bridge device, and could be a processor. An I/O bridge device forms an interface between an I/O bus, generally operating at a relatively lower speed, and a system internal bus such as a memory bus, generally operating at a higher speed.

A cache line state directory structure might contain one or more portions, and in the preferred embodiment, the cache line state directory structure contains multiple portions, a first of which is dedicated to a particular device as stated above, and a second of which contains entries for one or more processor caches in one or more processors. The cache line state directory is located external to the processor(s) and external to the device(s), and is used to determine whether it is necessary to send invalidation messages to either device(s) or processor(s).

In the preferred embodiment, the computer system is constructed according to a NUMA architecture, having multiple nodes, each node accessing a portion of main memory, although alternatively other architectures could be used. Each node maintains cache line state information for the portion of main memory allocated to the node. Cache line state information includes a local cache directory and a remote cache directory, which are conventional set-associative directories maintaining state information for processor caches. Each node further includes a separate local I/O cache directory and remote I/O cache directory, maintaining state information for local and remote I/O bridge device caches. The I/O cache directories contain a single entry for each cache line of the corresponding bridge device caches.

I/O bridge devices have relatively small caches with high turnover, i.e., any particular cache line of data typically resides in the cache for only a short time. As a result, the loading of cache lines to I/O bridge devices can generate a disproportionately large number of entries in a conventional set-associative cache line state directory. When such a cache line is removed from the cache by the I/O bridge device, this fact is not propagated to the cache line state directory, causing an accumulation of such entries in the state directory. For example, the state directory may accumulate 1000 entries or more for an I/O bridge cache. By establishing a separate directory portion having one entry for each line in the I/O bridge cache, the number of such entries in the state directory is limited to the number of entries in the bridge cache, which is typically a much smaller number (e.g., 16). Although it is still possible to send an unnecessary invalidation message based on an entry in the state directory, reducing the number of such entries will generally reduce the number of unnecessary invalidation messages.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
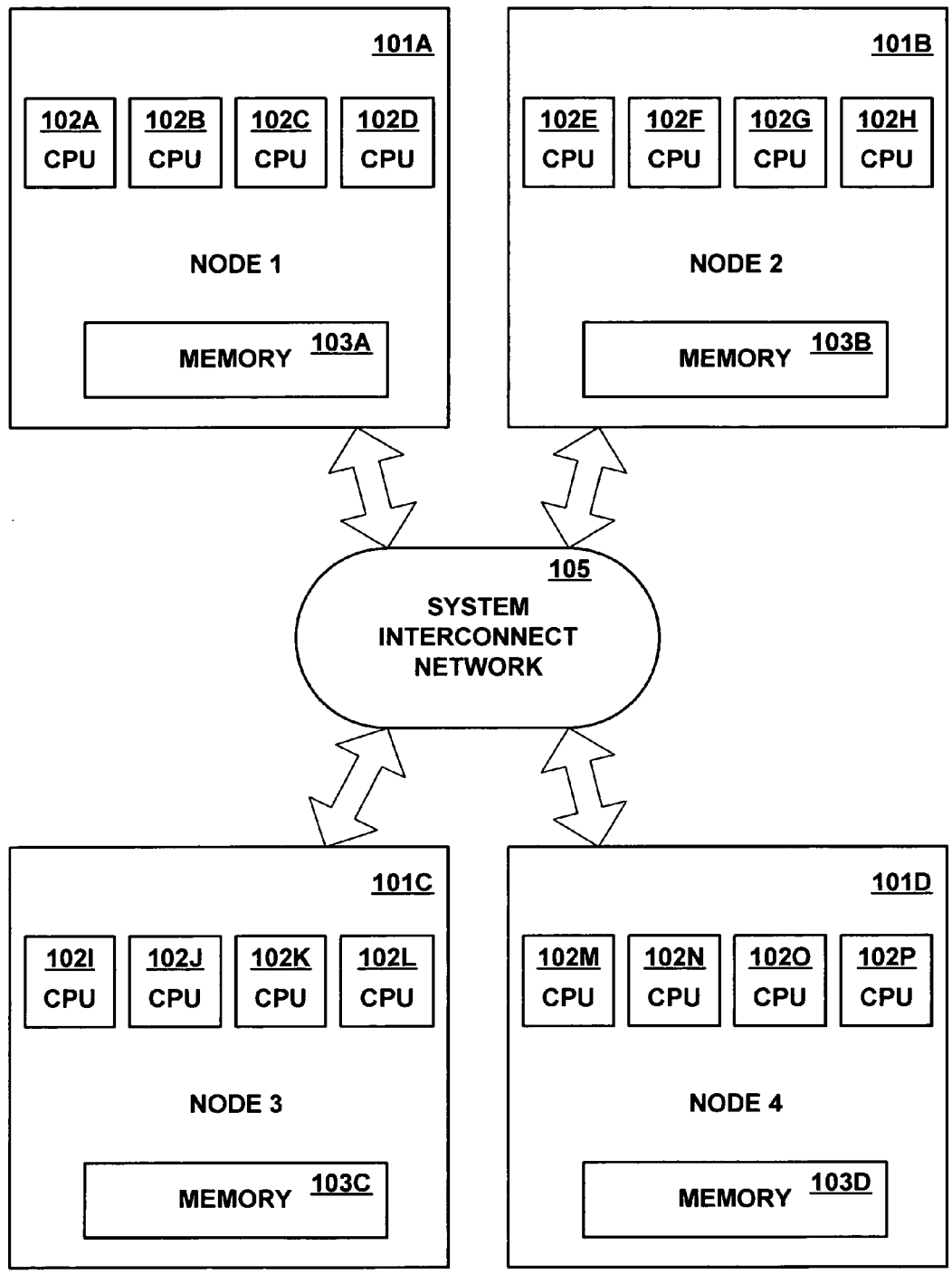
FIG. 1 is a high-level block diagram of the major hardware components of a multi-node, multi-processor computer system, according to the preferred embodiment of the present invention.

Referring to the Drawing, wherein like numbers denote like parts throughout the several views, FIG. 1 is a high-level block diagram of the major hardware components of a multi-node, multiprocessor computer system 100 in accordance with the preferred embodiment of the present invention. Computer system 100 is designed according to a NUMA architecture, it being understood that a computer system in accordance with the present invention need not necessarily be a NUMA system. Computer system 100 comprises multiple nodes 101A-101D (herein generically referred to as feature 101), of which four are shown in the exemplary system of FIG. 1, it being understood that the number of nodes may vary. Each node includes multiple general-purpose programmable central processing units (CPUs) 102A-102P (herein generically referred to as feature 102) and a respective local portion of main memory 103A-103D (herein generically referred to as feature 103).

Computer system 100 utilizes a distributed main memory, comprising a separate local memory 103A-103D in each respective node 101A-101D. Collectively, local memory portions 103A-103D constitute the main memory of computer system 100. The total addressable main memory within system 100 is the sum of the addressable local memory 103 in each respective node. The main memory is addressable using a single common real address space, which is shared by all CPUs throughout the system. A respective portion of the real address space is allocated to each local memory portion 103A-103D in a persistent, fixed manner. I.e., the address space allocation does not change with each task, process, user, or similar parameter, although it may be possible to change the allocation by reconfiguring the system. Thus, the real address space of main memory is constant across the entire system, and any memory location in a local memory 103 has a unique real address which is the same for all processors and all nodes.

The nodes are connected to one another by an inter-node communications network 105 that permits any node to communicate with any other node. The purpose of inter-node communications network is to allow devices to communicate across node boundaries, and in particular, to allow a processor in any node to access the memory resident in any other node. Inter-node communications network 105 may employ any technique, now known or hereafter developed, for supporting communication among multiple nodes in a computer system. Ideally, the inter-node communications medium should provide high bandwidth and low latency, and be scalable to allow for the addition of more nodes. Network 105 may be arranged as a set of point-to-point interconnection links, as a ring topology, as a common multi-drop bus topology, or in some other manner. Connections may be wired or wireless (e.g, optical), depending on system performance needs. As just one example, network 105 may be a switch-based network that uses the Scalable Coherent Interface (SCI) interconnection mechanism conforming to the IEEE 1596-1992 or subsequent standard. SCI is a high-bandwidth interconnection network implemented by a pumped bus that sends packets on each individual point-to-point interconnect.

Figure 2:
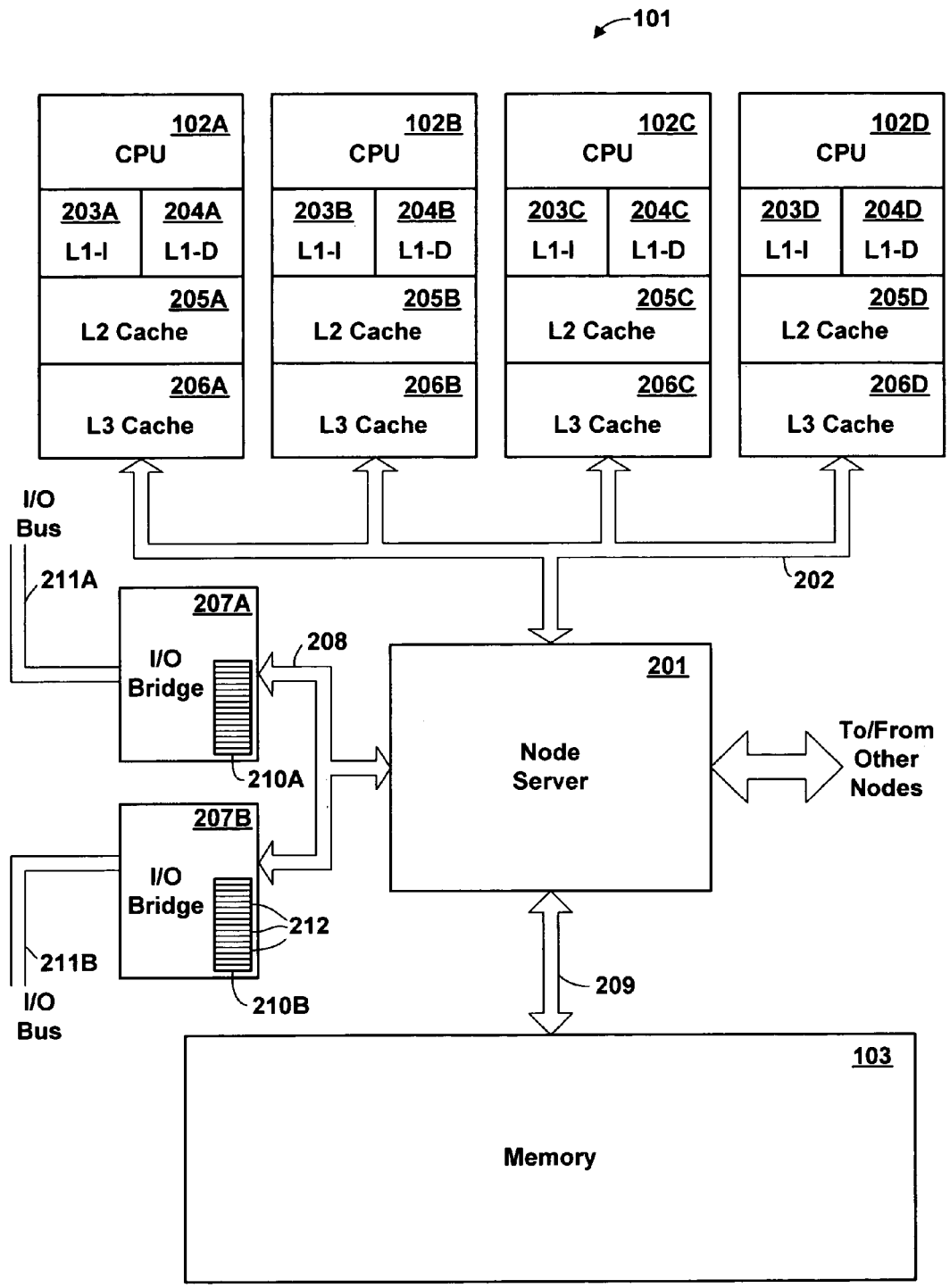
FIG. 2 is a high-level block diagram of the major hardware components of a typical node of a multi-node computer system of the preferred embodiment.

FIG. 2 is a block diagram of the major hardware components of a typical node 101 of computer system 100 in accordance with the preferred embodiment. Node 101 includes multiple central processing units (CPUs) 102, a local portion of main memory 103, a node server 201. A node may optionally include one or more I/O bridge interface units 207A-207B (herein generically referred to as feature 207), of which two are shown in FIG. 2. A local processor bus 202 connects the CPUs 102 with node server 201. A local I/O bridge bus connects I/O bridge interface units 207 with node server 201. A local memory bus 209 connects memory 103 with node server 201. Physically, node 201 is preferably implemented as multiple integrated circuit chips mounted on as single circuit card, having embedded printed circuit connections running among the various chips.

Each CPU 102 performs basic machine processing functions on instructions and other data from the distributed main memory. Each CPU contains or controls a respective set of caches for temporary storage of data and instructions. As represented in FIG. 2, each CPU contains or controls a respective level 1 instruction cache (L1 I-cache) 203A-203D (herein generically referred to as feature 203), a respective level 1 data cache (L1 D-cache) 204A-204D (herein generically referred to as feature 204), a respective level 2 cache (L2 cache) 205A-205D (herein generically referred to as feature 205), and a respective level 3 cache (L3 cache) 206A-206D (herein generically referred to as feature 206). L1 caches 203, 204 store instructions and non-instruction data, respectively, while L2 cache 205 and L3 cache 206 are common caches which do not distinguish between instructions and other data. In the preferred embodiment, a processor 102 and its associated caches 203-206 are constructed on a single semiconductor integrated circuit "chip", sometimes called a "processor chip", each processor being on a separate chip. The caches are therefore sometimes considered an integral part of the CPU, and sometimes considered separate entities. Although each CPU is shown with a set of four caches 203-206 in FIG. 2, it will be appreciated that the number and configuration of caches may vary. Specifically, there may be more than or fewer than three levels of cache, and some caches (usually lower level caches) may be shared by multiple CPUs. L2 caches are typically inclusive of the L1 caches, i.e., all data in the L1 caches is also contained in the corresponding L2 caches. However, the L3 caches may or may not be inclusive of the L2 caches, depending on processor design.

Local processor bus 202 couples the CPUs 102 and their associated caches to node server 201. Although represented in FIG. 2 as a simple multi-drop bus, local processor bus 202 may be constructed according to any of various architectures, now known or hereafter developed, and may be constructed as multiple separate buses.

Node server 201 provides a central point of control for data flowing into and out of node 101, and between certain functional units within node 101. The function of node server 201 is explained in further detail herein, with reference to FIG. 3.

Local memory portion 103 is coupled to node server 201 via local memory bus 209. Local memory portion 103, while represented as a single monolithic entity in FIGS. 1 and 2, is typically constructed as a bank of discrete integrated circuit chips, as is known in the art. Local memory bus 209 accordingly is a communications bus coupled to all such chips, and may be constructed according to any conventional technique or any technique hereafter developed.

Each I/O bridge interface unit 207 provides an interface to a respective I/O bus 211A-211B (herein generically referred to as feature 211), and is coupled to node server via local I/O bridge bus 208. Each I/O bridge contains a respective cache 210A-210B (herein generically referred to as feature 210) for temporary storage of data moving across the interface, each cache 210 containing multiple slots 212, each slot for storing a single cache line of data. Each I/O bus 211 connects one or more I/O devices (not shown) to node 101. I/O devices may include any of various devices, such as direct access storage devices, tape drives, workstations, printers, and remote communications adapters for communications with remote devices or with other computer systems through dedicated communications lines or networks. The number and range of I/O devices may vary considerably, and may include devices hereafter developed. I/O bridge unit 207 provides an interface between two different buses, and in particular, is able to temporarily store data being transferred from a bus operating at one speed to another bus operating at a different speed in cache 210. I/O buses 211 may be of any suitable type for communication with I/O devices. For example, I/O bus 211 may be an industry standard PCI bus. Typically, I/O bus 211 operates at a significantly slower speed than local I/O bridge bus 208. Although two I/O bridge units 207 and two I/O buses 211 are shown in FIG. 2, it should be understood that the number of such bridge units and buses and devices may vary, and further that it is not necessary that all nodes 101 contain I/O bridge units 207 or attached I/O devices.

While a system having four nodes is shown in FIG. 1, and a typical node having four CPUs and various other devices is shown in FIG. 2, it should be understood that FIGS. 1 and 2 are intended only as a simplified example of one possible configuration of a system for illustrative purposes, that the number and types of possible devices in such a configuration may vary, and that the system often includes additional devices not shown. It should further be understood that it is not required that all nodes be identical, that all nodes have the same number of CPUs or the same amount of addressable local memory, or that all nodes have attached I/O buses and I/O devices. Finally, although the system of the preferred embodiment is a multi-node system employing a NUMA architecture, the present invention might be utilized in systems designed according to different architectural principles, or in a system having only a single node. While various system components have been described and shown at a high level, it should be understood that a typical computer system contains many other components not shown, which are not essential to an understanding of the present invention.

Figure 3:
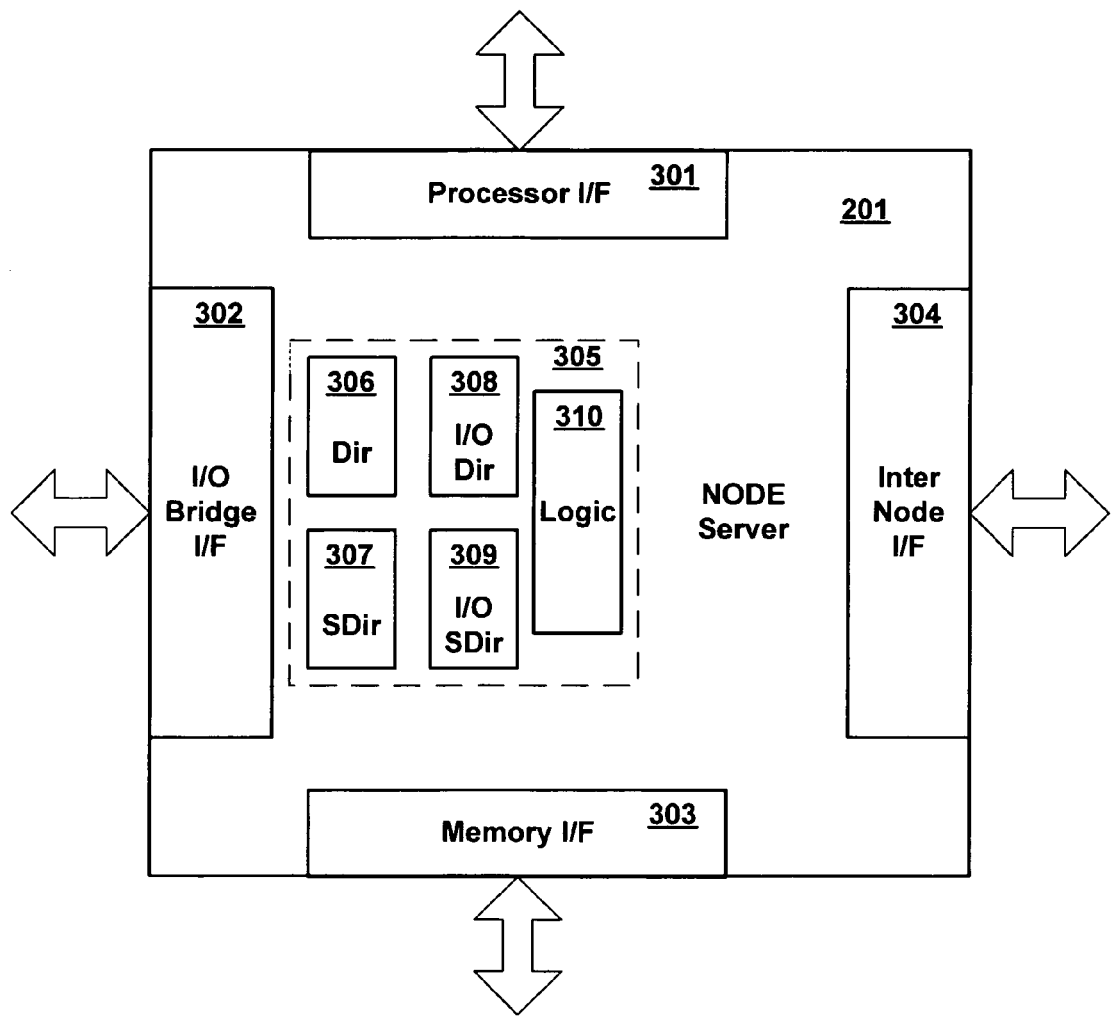
FIG. 3 is a block diagram showing in greater detail the major components of a node server, according to the preferred embodiment.

FIG. 3 is a block diagram showing in greater detail the major components of node server 201, according to the preferred embodiment. Node server 201 includes local processor bus interface 301, I/O bridge bus interface 302, local memory interface 303, and inter-node network interface 304, for communicating with various other system components. Node server 201 further includes a cache line state directory structure 305, which includes local processor directory 306, remote processor directory 307, local I/O bridge directory 308, and remote I/O bridge directory 309, the functions of which are explained further herein. Node server further includes cache coherence logic 310 necessary for maintaining the cache line state directory 305, and for generating and responding to cache coherency messages, as further explained herein. Node server further includes various other logic and memory structures for supporting intra-nodal and inter-nodal data communications, maintaining state information, buffering data, and so forth, which are not essential to an understanding of the present invention, and which have been omitted from FIG. 3 for clarity of representation.

Among other things, node server 201 provides communication means among the various components of node 101, and between components of node 101 and devices (particularly, other nodes) external to node 101. In particular, node server 201 transfers data between local memory 103 and caches 203-206 of local CPUs 102 responsive to memory accesses issued by the CPUs. In the case where a requested memory access references data in the memory of a remote node, node server transmits the request to the remote node through inter-node interface 304 and network 105, receives the data responsive to the request, and forwards it to the requesting CPU (i.e., typically a cache of the requesting CPU). Similarly, node server 201 receives requests from other nodes (i.e., requests originating in a CPU of another node, and forwarded by the node server of that other node) for data residing in local memory portion 103 of node 101, retrieves the requested data from local memory, and forwards it to the requesting node over network 105. It will be observed that a memory access to a real address within local memory 103 will cross node server 201 within the same node and return in a relatively short number of machine cycles, while a memory access to a real address within the local memory of a remote node will cross node server 201 in the originating node, network 105, and a corresponding node server 201 in a remote node containing the requested data, to reach the local memory of the remote node in which the data resides. (This operation may in some cases be shortened if the requested data is in a cache in the local node.) As a result, a memory access to a remote node generally requires a relatively greater number of cycles.

Similarly, node server 201 serves as a conduit for data being transferred to or from an I/O device via an I/O bridge interface unit 207 on the one hand, and local memory 103, a local processor 102, or a remote node (through network 105), on the other hand.

The node servers 201 in the various nodes further maintain cache state information and enforce cache coherency. Cache line state directory structure 305 carries the required state information. Briefly, each node maintains the state of cache lines originating from the node's local memory, and the state of cache lines for caches in the node. When a processor or I/O bridge unit requests data from memory for its cache, an entry is made in the directory structure of the node in which the processor or bridge unit resides, and in the node containing the memory address of the cache line in real memory (if this is a different node). Where the request is a non-exclusive request for data (meaning that copies of the data may concurrently reside in other caches, generally the case for data to be read and not written), the corresponding directory structures in the applicable node or nodes indicate that the data has a shared state. Where the request is an exclusive request, or where data is being written, as an I/O device performing a direct memory access (DMA) write, an invalidation message will be sent to all caches having a copy, causing the caches to invalidate the corresponding cache line.

The major function of the cache line state directory structure 305 is determine whether and whither to send an invalidation message. I.e., it would be possible to simply send invalidation messages to all caches every time an event occurs which might invalidate data in a cache, and let each the cache determine whether the invalidation message is applicable. In fact, some computer systems use such a technique, and generally provide special hardware supporting the transmission of invalidation messages. However, for many systems, and particularly a NUMA system according to the preferred embodiment, invalidation messages pass through the general inter-node communication network, I/O bridge bus, and so forth. A large number of such messages can clog the communications channels. In most cases, data which is the subject of a write or an exclusive read request will not be in any other cache, and invalidation messages are unnecessary. Cache line state directory structure 305 reduces, although it does not entirely eliminate, the number of unnecessary invalidation messages by recording cache line allocations and state.

In the preferred embodiment, directory structure 305 contains four major components: local processor directory 306, remote processor directory 307, local I/O bridge directory 308, and remote I/O bridge directory 309. Local processor directory 306 contains cache line state for cache lines in any of the caches associated with a local processor within the same node as the node server containing the directory. Remote processor directory 307 contains cache line state for cached lines of local memory (stored in memory portion 103 within the same node as the node server containing the directory), which are cached in any of the caches associated with a remote processor, i.e., a processor in a different node. Local I/O bridge directory 308 contains cache line state for cache lines in any of the local I/O bridge units. Remote I/O bridge directory contains cache line state for cached lines of local memory, which are cached in any of the caches of a remote I/O bridge unit, i.e., an I/O bridge unit in a remote node.

Figure 4:
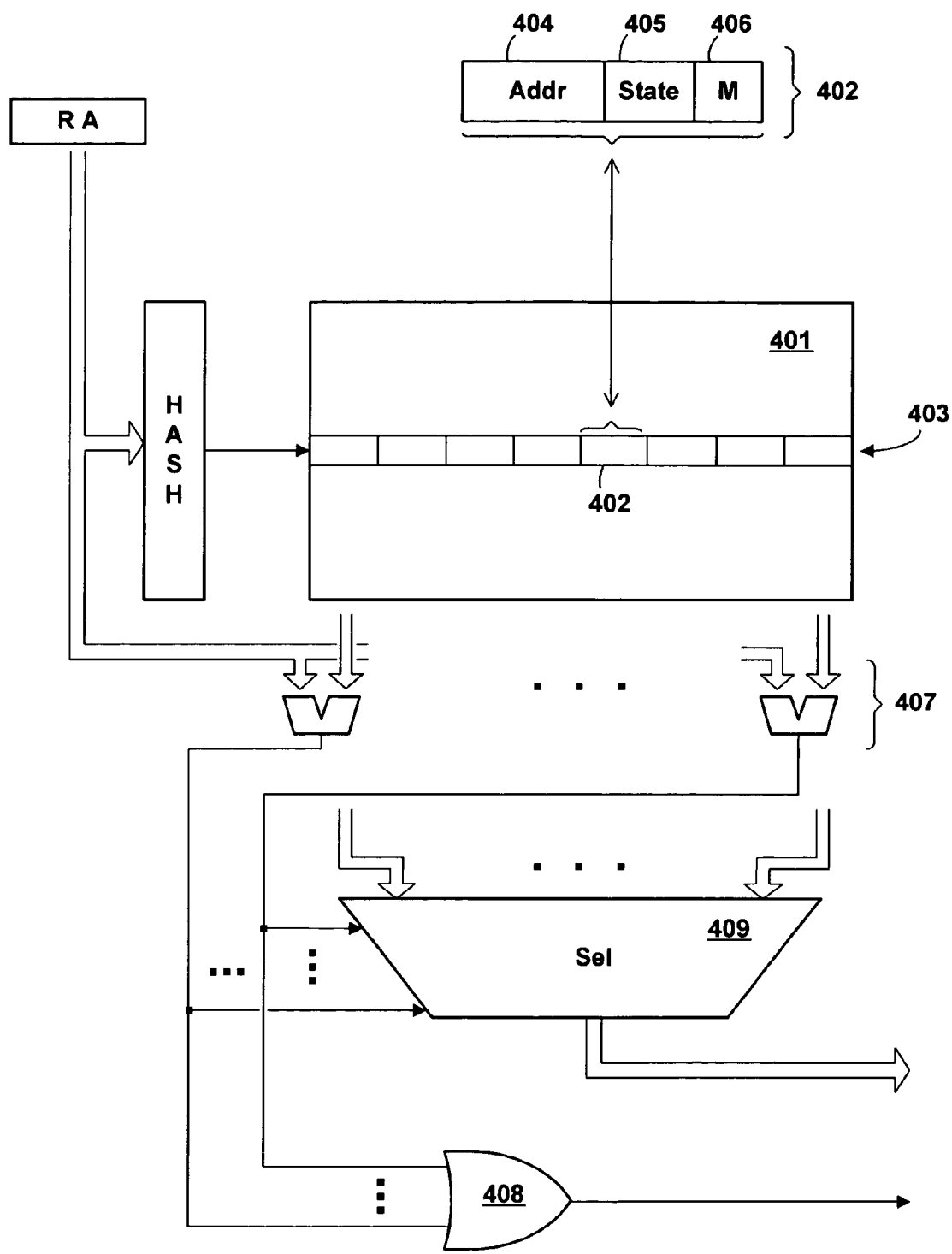
FIG. 4 represents the structure of a local processor directory portion or a remote processor directory portion (both being similar) of a cache line state directory structure within a node server, according to the preferred embodiment.
Figure 5:
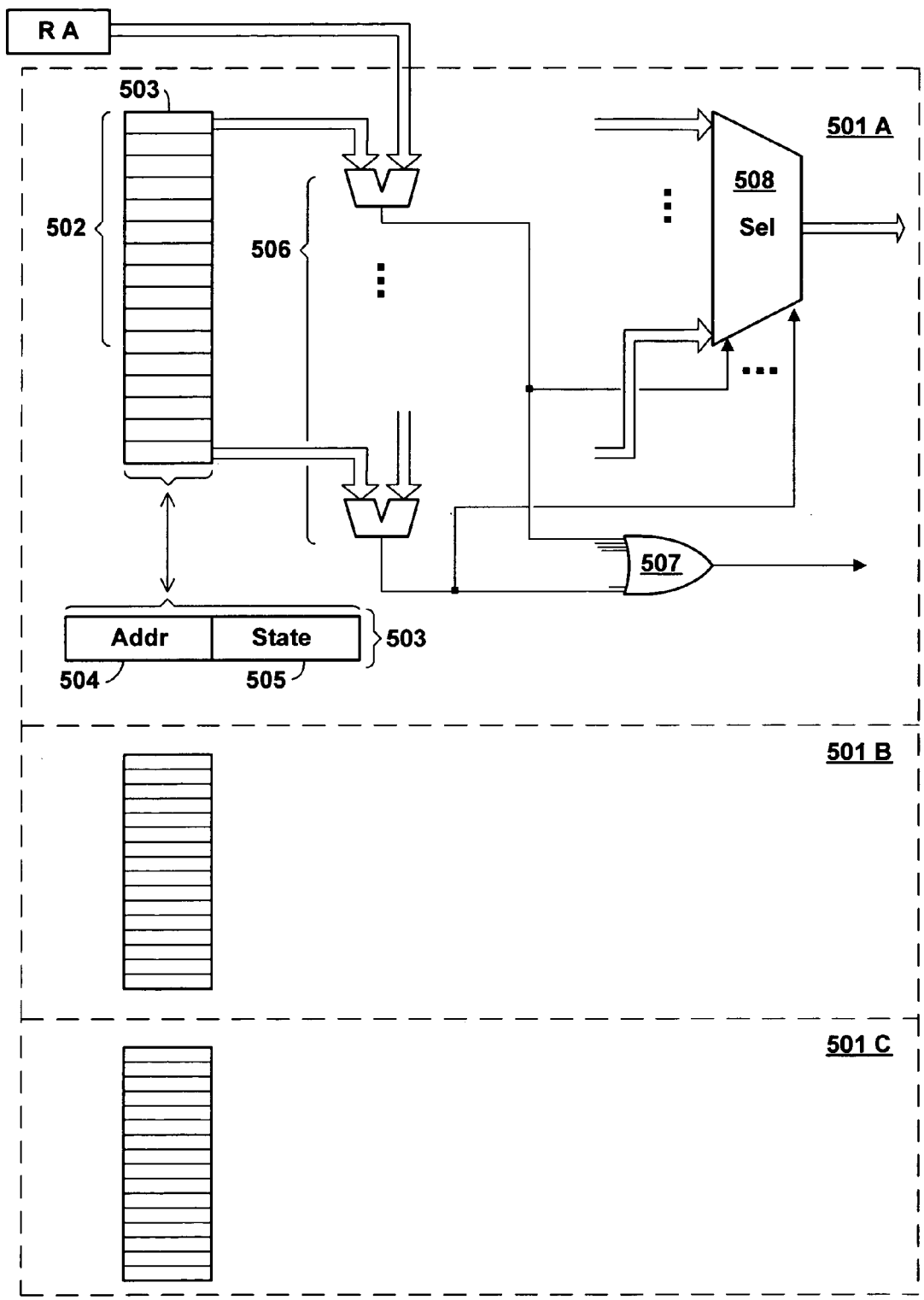
FIG. 5 represents the structure of a local I/O bridge directory portion or a remote I/O bridge directory portion (both being similar) of a cache line state directory structure within a node server, according to the preferred embodiment.

FIGS. 4 and 5 represent the structure of the four major components of the cache line state directory 305 and certain associated hardware. In the preferred embodiment, local processor directory 306 and remote processor directory 307 have similar structure, and both are represented by FIG. 4. Local I/O bridge directory 308 and remote I/O bridge directory 309 likewise have similar structure, and both are represented by FIG. 5.

Referring to FIG. 4, local processor directory 306 (or remote processor directory 307) includes a set associative array 401 of cache line status entries 402, the array being arranged in multiple rows 403, each row having multiple entries. Each entry 402 contains an address field 404, a state field 405, and some miscellaneous bits 406 used for maintaining the directory or other purposes, specifically an age value which can be used to determine which entry to remove from array 401, when it is necessary to remove an entry.

A row of array 401 is accessed using a hash function of the real address of a data reference. The hash function is typically several low order bits of real address, above the bits which determine an offset address within a cache line. E.g., if a cache line holds 128 bytes of data (requiring 7 address bits), then the hash function is typically the taken from the low order address bits immediately above the 7 lowest order bits of offset address. The number of real address bits N used for the hash function depends on the number of rows in array 401, array 401 having $2^N$ rows. Each entry 402 corresponds to a cache line of memory having the same N real address bits of the hash function used to select the row. Therefore, address field 404 contains only the real address bits other than those used as the hash function to select the row (and other than the offset address bits).

When a row is selected using a portion of a real address, the address fields 404 of each entry 402 in the selected row are input to respective comparators 407, which compare the address fields with the corresponding real address bits of the data reference. If any of the addresses match, then OR gate 408 outputs a corresponding match signal. In this case, the referenced data may exist in one of the caches to which the directory array 401 corresponds. The output of the corresponding comparators controls selector logic 409, which receives as input the state fields 406 of the various entries. If there is an address match, this state is output by selector 409. If there is no match, then the referenced data is not in any cache to which directory array 401 corresponds, and the match signal from OR gate 408 is accordingly shut off.

Each entry 403 in array 401 represents a cache line of data which may be stored in one or more caches, and therefore the entry corresponds to the cache line address in memory, not to any particular cache or cache location. The number of entries in array 401 is preferably significantly larger than the number of cache lines in the corresponding caches, meaning that array 401 typically holds entries for cache lines which are no longer in the caches. Array 401 is designed with a larger number of entries to avoid the need for precise tracking of the contents of the caches, which would be difficult. When a new cache line is to be loaded to a processor cache, requiring a new entry in array 401, it is not necessary to determine which cache line is being removed from the cache; it is only necessary to find a cache line which is no longer used. The fact that array 401 may contain superfluous entries only means that some unnecessary invalidation messages may be sent for data which is referenced by an entry in array 401, but is in fact no longer in the cache, or if in the cache, has already been invalidated.

Although row 403 is represented in FIG. 4 with eight entries 402, this number is chosen for simplicity of illustration, and is not necessarily intended to represent an actual number of entries. The actual number of entries may vary, and this number could be a fixed amount, or could be programmatically variable to allocate a portion of each row to the local directory 306 and another portion to the remote directory 307.

I/O bridge cache directories are organized differently, to support the different character of I/O bridge caches. I/O bridge caches 210 are typically used to support different transmission speeds on the I/O buses. Unlike a processor cache, outbound data in an I/O bridge cache (a DMA read) is usually read only once before being removed from cache. Inbound data (a DMA write), which is written to memory once and not further referenced by the I/O device, is not placed in the cache (although it may be stored temporarily in a buffer in the I/O bridge device). Therefore I/O bridge caches are typically small caches characterized by a high rate of data turnover. For example, in the preferred embodiment a typical I/O bridge cache contains 16 slots 212 for storing up to 16 cache lines.

In contrast to local processor directory 306 and remote processor directory 307, the local I/O bridge directory 308 and remote I/O bridge directory 309 contain entries which correspond to actual cache locations (slots). The I/O bridge unit informs the node server where a cache line will be placed in its cache when it requests data. Since only one entry exists for any particular cache location, each new data request automatically overwrites old data in the I/O bridge directory. Therefore, bridge directory entries are limited to the small number of cache line slots in the corresponding I/O bridge caches, and are automatically maintained by overwriting the old entries when a new cache line is loaded to the cache, without the need to invalidate data corresponding to existing entries in the bridge directory.

Referring to FIG. 5, local I/O bridge directory 308 (or remote IO bridge directory 309) is divided into one or more sections 501A-501C (herein generically referred to as feature 501), each section corresponding to a respective I/O bridge cache 210. Each section 501 includes a bank 502 of cache line status entries 503, the number of entries 503 in each bank being the same as the number of cache line slots 212 in the corresponding I/O bridge cache 210. Each entry 503 contains an address field 504 and a state field 505. Detail is omitted from sections 501B and 501C for clarity.

Address field 504 contains a full real address of the cache line (without the lowest order bits used to determine an offset location within a cache line). The address field 504 of each entry 503 in bank 502 is compared with the corresponding address bits of a data reference by respective comparators 506. If any address field address matches the real address of the data reference, then OR gate 507 outputs a corresponding match signal. In this case, the referenced data may exist in the I/O bridge cache to which the directory section 501 corresponds. The output of the corresponding comparators 506 controls selector logic 508, which receives as input the state fields 505 of the various entries. If there is an address match, this state is output by selector 508. If there is no match, then the referenced data is not in the cache to which directory section 501 corresponds, and the match signal from OR gate 507 is accordingly shut off.

Various cache line states stored within state fields 405 and 505 may be supported, for example, according to a known MESI state protocol ("modified", "exclusive", "shared" and "invalid" states). However, in the preferred embodiment, the only states supported for the I/O bridge cache directories 308, 309 are "shared", "invalid", and, in the case of remote directory 309, a transitional state "R" for a brief time when data is being transmitted to a remote node. An I/O bridge cache does not acquire exclusive ownership of data, as a processor cache might.

Node server 201 functions as a data conduit and maintains cache line state directory information. FIGS. 6-9 are flow diagrams representing certain aspects of the function of a node server in response to various cache access requests, according to the preferred embodiment. Although the functions of the node server are represented in a set of flow diagrams for illustrative purposes, the fact that flow diagrams are used is not meant to imply that certain operations are actually performed sequentially or in the order represented. In many cases, multiple functions and decisions will be performed concurrently by different hardware elements.

Figure 6:
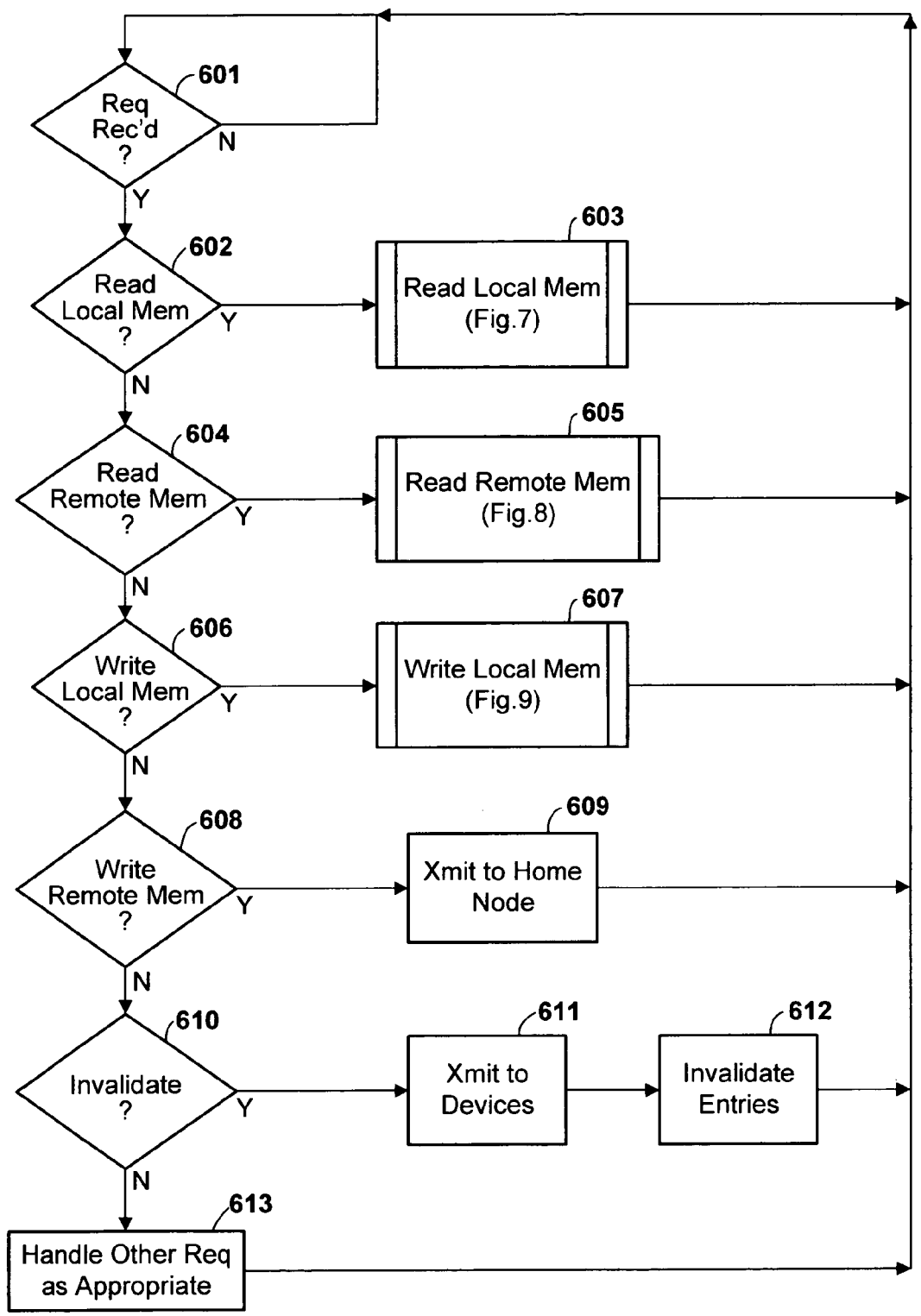
FIG. 6 is a high-level decision flow diagram of the function of a node server, according to the preferred embodiment.

Referring to FIG. 6, which is a high-level decision flow diagram of node server function, node server waits at block 601 for incoming requests of various types, which may come from local processors, I/O devices attached to local I/O bridge units, or processors or I/O devices attached to remote nodes. If a request to read local memory is received (block 602), local memory is read in response to the request (block 603), as explained in greater detail in FIG. 7. If a request to read memory in a remote node is received (block 604), remote memory is read in response to the request (block 605), as explained in greater detail in FIG. 8. If a request to write to local memory is received (block 606), local memory is written to in response to the request (block 607), as explained in greater detail in FIG. 9. If a request to write to remote memory is received (block 608), the request is transmitted to the node server in the home node for appropriate action, i.e., the request is transmitted to the node in which the real memory address of the write request is contained. (block 609). If a request to invalidate a cache line is received (block 610), i.e., a request from a node server in another node to invalidate a cache line of a memory address in that other node, the node server responds by invalidating the corresponding entry or entries in its local processor directory 306 or local I/O bridge directory 308 (block 612); the node server also transmits the invalidation message to the corresponding device(s) (processor or I/O bridge) (block 611). In all other types of requests, not essential to understanding the present invention, the node server handles the request as appropriate (block 612).

Figure 7:
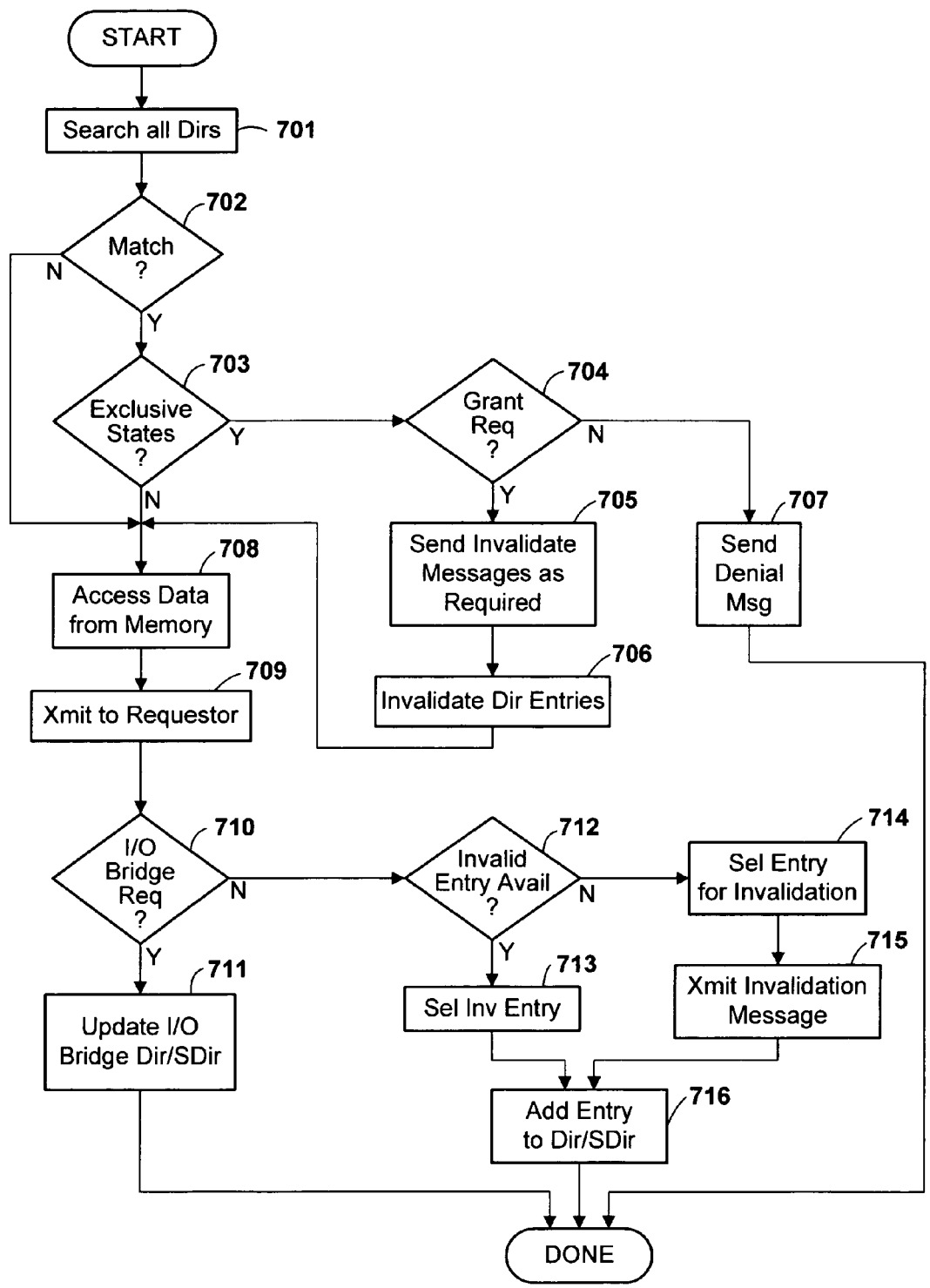
FIG. 7 is a flow diagram showing in greater detail the handling of a read local memory request by a node server, according to the preferred embodiment.

FIG. 7 is a flow diagram showing in greater detail the handling of a read local memory request by a node server, i.e., a request from any source to read memory from the local memory portion 103 of the node server's node. In response to receiving the request, the node server checks all directories 306, 307, 308, 309 of the cache line state directory structure 305 for an address which matches the address of the requested data (block 701). If a matching address is found ('Y' branch from block 702), the node server determines whether the state of the existing cache line and the requested data are mutually exclusive, i.e. can not co-exist together (block 703). If the states are mutually exclusive (the 'Y' branch from block 703), the node server determines whether to grant the request (block 704). The request may be granted or denied, based on certain pre-defined state priorities, process priorities, or other factors. If the request is denied, a message to that effect is generated to the requester (step 707), and servicing the request ends. If the request is granted, the node server transmits an invalidation message or messages as required (block 705). The invalidation messages are transmitted to those entities possibly having cache line data conflicting with the request. I.e., if the conflicting cache line was in the local processor directory 306, the invalidation message is broadcast to all local processors on the local processor bus 202; if the conflicting cache line was in the local I/O bridge directory 308, the invalidation message is sent to the appropriate I/O bridge unit over local I/O bridge bus 208; if the conflicting cache line was in the remote processor directory 307, the invalidation message is broadcast to all remote nodes via network 105; and if the conflicting cache line was in the remote I/O bridge directory, the invalidation message is sent to the node(s) containing the I/O bridge unit(s) with the conflicting cache line. The state field 405 or 505 of the corresponding directory entries are then set to 'invalid' (block 706).

If no conflicting cache line was found at blocks 702 or 703, or after a conflict has been resolved by invalidating cache lines at blocks 704-706, the node server reads the requested data from local memory 103 over local memory bus 209 (block 708). The data is then transmitted to the requesting entity (block 709), which may be a local entity or a remote node. If the requestor was an I/O bridge device (block 710), the node server updates the local I/O bridge directory 308 or remote I/O bridge directory 309, as the case may be, with the new cache line address (block 711). A data read request from an I/O bridge unit will include the cache slot in which the cache line to be read will be placed. The node server therefore knows where the cache line will be placed, and updates the cache line entry 503 which corresponds to the cache line slot indicated in the read request.

If the requestor was a processor (the 'N' branch from block 710), then the node server must find an available entry in the local processor directory 306 or remote processor directory 307, as the case may be, for entering the address and state of the requested cache line. If an invalid entry having the same address hash bits exists (block 712), this entry is selected (block 713). If not, an entry is selected for invalidation (block 714), and an invalidation message is sent to the local processors or remote node, as the case may be (block 715). The entry selected for invalidation at block 714 is generally the oldest entry, based on information in M field 406, although other algorithms could be used. Because the directories contain substantially more entries than there are cache slots available, the entry selected will usually identify a cache line which has already been removed from the cache (although the directory information, which is not always current, indicates otherwise). An invalidation message is necessary to be certain that the cache line is removed from cache, although in most cases the receiving processor will simply ignore it because the cache line is no longer there. In either case, the applicable directory is then updated with the new entry (block 716).

Figure 8:
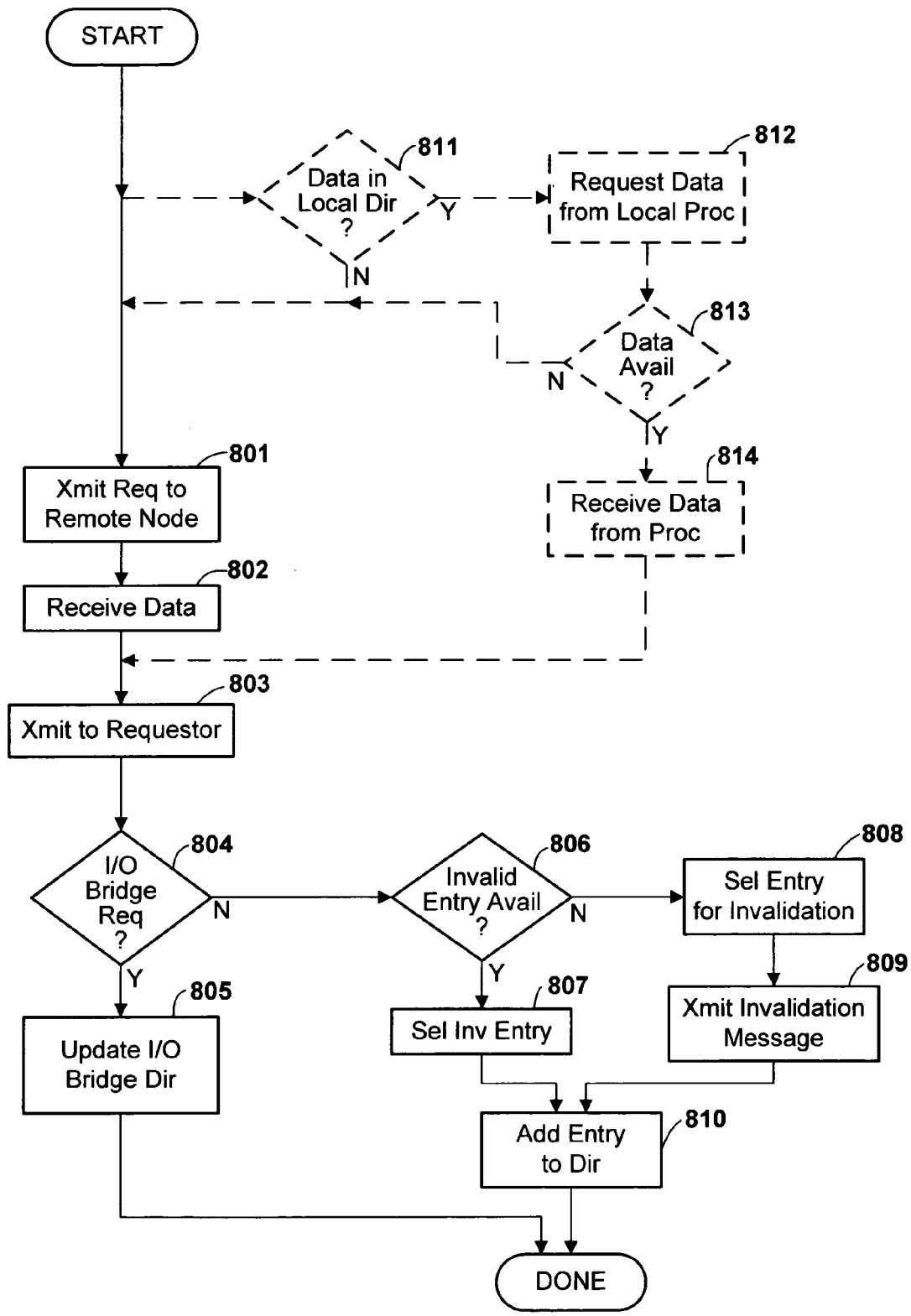
FIG. 8 is a flow diagram showing in greater detail the handling of a read remote memory request by a node server, according to the preferred embodiment.

FIG. 8 is a flow diagram showing in greater detail the handling of a read remote memory request by a node server, i.e., a request from a local source to read memory from another node. In response to receiving the request, the node server forwards the request to the remote node (block 801). It waits to receive the requested data in response, and when the data is received (block 802), it is forwarded to the requesting entity (block 803). The remote node then updates the local processor directory 306 or local I/O bridge unit directory 308, as the case may be (blocks 804-810), in the manner described above with respect to blocks 710-716, respectively.

The local processor directory might optionally be used to obtain cache data locally where possible, as indicated by optional blocks 811-814. I.e., the node server may check local processor directory 306 for the requested data (block 811), and if valid, non-exclusive data at the same address as the requested data is indicated in the directory, the data is requested from a cache in a local processor (block 812). If the data is in fact available (block 813), the data is received from the local processor (block 814), and the node server continues at block 803. If the data is in fact unavailable (the 'N' branch from block 813), the node server requests the data from another node (block 801).

Figure 9:
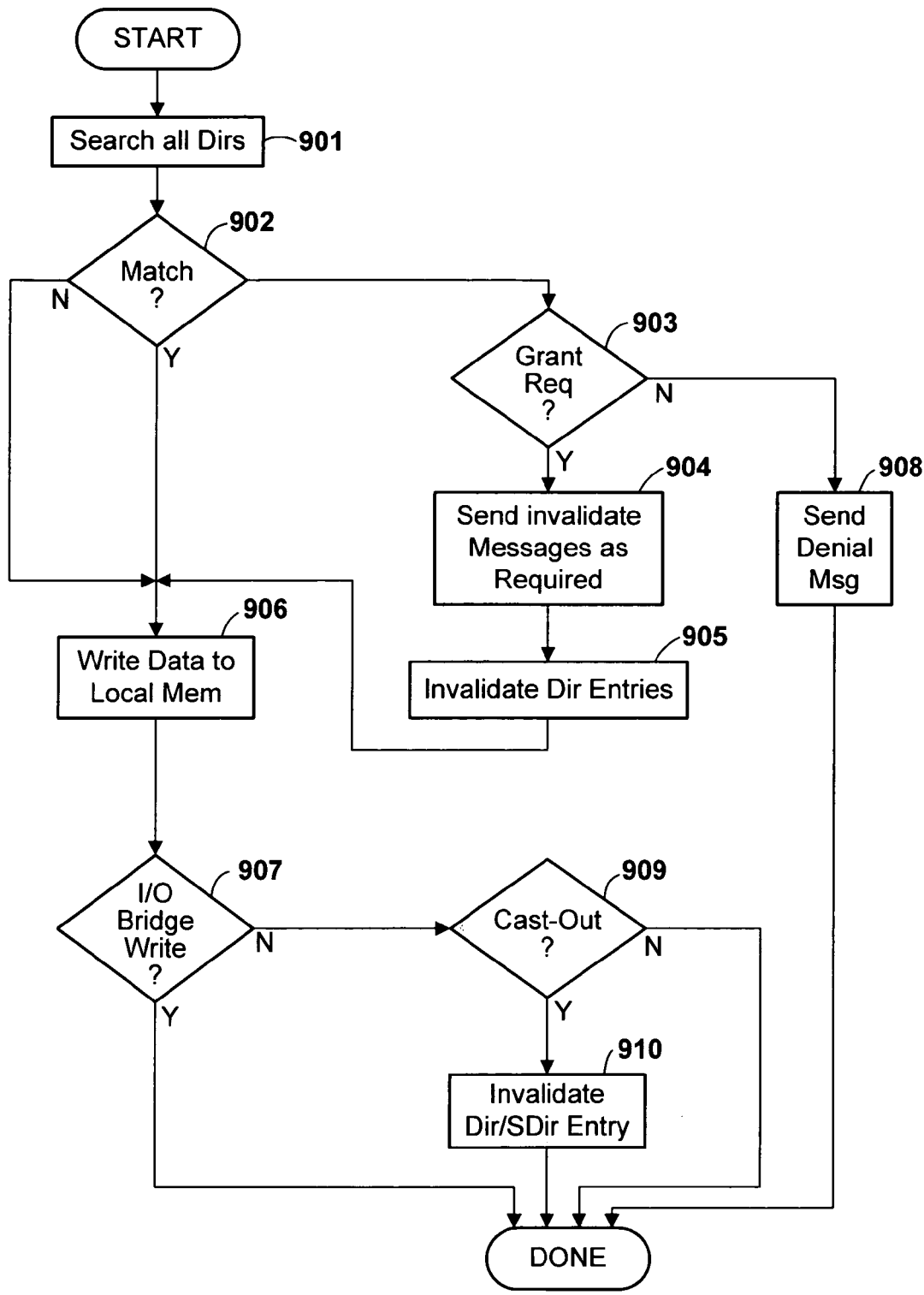
FIG. 9 is a flow diagram showing in greater detail the handling of a write local memory request by a node server, according to the preferred embodiment.

FIG. 9 is a flow diagram showing in greater detail the handling of a write local memory request by a node server, i.e., a request from either a local or remote source to write a cache line to memory of the local node of the node server. In response to receiving the request, the node server checks all directories 306, 307, 308, 309 for an address which matches the address of the requested data (block 901). If a matching address is found ('Y' branch from block 902), the node server determines whether to grant the request (block 903). Typically, a write request is granted, although there may be special cases where this is not so. If the request is denied, a message to that effect is generated to the requester (block 908), and servicing the request ends. If the request is granted, the node server transmits an invalidation message or messages as required (block 904). The invalidation messages are transmitted to those entities possibly having cache line data invalidated by the write. I.e., if the matching cache line was in the local processor directory 306, the invalidation message is broadcast to all local processors on the local processor bus 202, and so forth for the remaining directories. The state field 405 or 505 of the corresponding directory entries are then set to 'invalid' (block 905), except for the directory applicable to the requesting processor. It will be noted, for example, that in the case of a cache line of data in a processor directory, there could be multiple processor caches holding the same cache line. Block 904 assures that any processor other than the requesting processor will invalidate its cache line in response to the message. The requesting processor may or may not invalidate its cache line, depending on the nature of the write operation. As explained herein with respect to blocks 909-910, the corresponding entry in a local processor directory 306 or remote processor directory 307 may be invalidated, depending on the write operation.

If no match was found at block 902, or if a match was found and the request was granted at block 903, followed by blocks 904 and 905, the node server writes the cache line of data to local memory 103 over local memory bus 209 (block 906). If the write request was from an I/O bridge device (a DMA write) (the 'Y' branch from block 907), no further action is required by the node server. Since DMA write data is not stored in a cache of an I/O bridge device, it is not necessary to further invalidate anything. If the write request was not from an I/O bridge device, i.e., was from a processor (the 'N' branch from block 907) and data is being cast out of the cache (the 'Y' branch from block 909), then the corresponding entry in the local processor directory 306 or remote processor directory 307, as the case may be, is invalidated (block 910). If the data is not being cast out of cache (the 'N' branch from block 909), the status in the directory remains unchanged.

In the preferred embodiment as described above, a computer system contains multiple nodes and a main memory which is distributed among the various nodes, resulting in non-uniform memory access. However, a method and apparatus for tracking cached addresses in accordance with the present invention is not necessarily limited to use in a NUMA architecture, and in an alternative embodiment, different system architectures may be used. Furthermore, a system may be similar to that described herein, but contain only a single node.

In the preferred embodiment described above, a separate device directory section is maintained for each I/O bridge device, in which each directory entry corresponds to a physical cache slot. Although the exemplary device is an I/O bridge device, it will be appreciated that other devices may also contain caches, for which such a technique would be useful, and a device need not be an I/O bridge device. For example, an external network interface or similar communications interface may contain a such a cache. Such a device could even be one of the processors.

In the preferred embodiment described above, a cache line state directory structure includes separate processor portions and I/O bridge device portions, which are differently organized, the processor portion be organized as a conventional set-associative directory. However, a cache line state directory which maintains device cache state information (preferably for an I/O bridge device) in accordance with the present invention may include a processor portion which is organized differently from a conventional set-associative directory, and need not include a processor portion at all. Specifically, the cache line state directory may exist only for maintaining cache line state for, and determining whether to send invalidation messages to, one or more devices, which are preferably, although not necessarily, I/O bridge units.

Although a specific embodiment of the invention has been disclosed along with certain alternatives, it will be recognized by those skilled in the art that additional variations in form and detail may be made within the scope of the following claims:

What is claimed is:

1. A digital data processing system, comprising:
a memory;
at least one processor having at least one associated cache for temporarily caching data from said memory;
at least one device having a device cache, said device cache having a fixed number of slots for caching data, said fixed number being greater than one, each slot caching a cache line of data; and
a cache coherency mechanism, said cache coherency mechanism including a cache line state directory structure, said cache coherency mechanism selectively determining whether to send cache line invalidation messages to said at least one device using state information in said cache line state directory structure, wherein at least a portion of said cache line state directory structure associated with said at least one device contains exactly said fixed number of cache line entries, each entry having a fixed correspondence to a unique respective one of said fixed number of slots for caching data of said device cache.

2. The digital data processing system of claim 1, wherein said device is an I/O bridge device.

3. The digital data processing system of claim 1, wherein a processor portion of said cache line state directory structure contains cache line state for at least one said cache associated with a processor, said processor portion being separate from said at least a portion of said cache line state directory structure associated with said at least one device, said processor portion containing a plurality of cache line entries, each entry having a fixed correspondence to a respective set of real addresses, said cache coherency mechanism further selectively determining whether to send cache line invalidation messages to the processor with which the cache is associated using state information in said processor portion of said cache line directory structure.

4. The digital data processing system of claim 3, wherein said processor portion of said cache line state directory structure contains cache line state for a plurality of caches associated with a plurality of processors, said cache coherency mechanism further selectively determining whether to send cache line invalidation messages to any of said plurality of processors using state information in said processor portion of said cache line directory structure.

5. The digital data processing system of claim 1, wherein said digital data processing system comprises a plurality of nodes, each node containing at least one processor, a respective portion of said memory, and a respective portion of said cache coherency mechanism.

6. The digital data processing system of claim 5, wherein each said respective portion of said cache coherency mechanism in each respective node maintains cache line state information for cached data having a real address in the respective portion of said memory contained in the node.

7. The digital data processing system of claim 5, wherein each said respective portion of said cache coherency mechanism in each respective node maintains cache line state information for data cached in devices contained in the node.

8. The digital data processing system of claim 1,
wherein said digital data processing system comprises a plurality of devices having respective device caches, each said device cache having a respective fixed number of slots for caching data, each slot caching a cache line of data; and
wherein said cache line state directory structure includes a plurality of portions, each portion corresponding to a respective one of said plurality of devices, each portion containing a respective fixed number of cache line entries equal to said respective fixed number of slots for caching data of the device cache to which the respective portion corresponds, each entry corresponding to a unique respective one of the respective fixed number of slots for caching data of the device cache to which the respective portion corresponds.

9. A method for maintaining cache coherency in a digital data processing system, comprising the steps of:
maintaining a cache line state directory structure, said cache line state directory structure having at least a portion corresponding to a device cache in a device of said digital data processing system, said portion containing exactly N cache line entries, wherein N is a fixed number greater than one, each entry having a fixed correspondence to a unique respective one of N slots for caching lines of data in said device cache, said device cache containing exactly N slots for caching N lines of data;
responsive to each of a plurality of data access requests, accessing said cache line state directory structure to determine whether data having a data address referenced by the request is contained in said device cache;
for each of said plurality of data access requests, determining whether to send an invalidation message to said device based on whether said step of accessing said cache line state directory determines that data having a data address referenced by the request is contained in said device cache; and
for each of said plurality of data access requests, sending an invalidation message to said device responsive to the determination made by said step of determining whether to send an invalidation message.

10. The method of claim 9, wherein said device is an I/O bridge device.

11. The method of claim 9, further comprising the steps of:
receiving a plurality of data access requests for cache lines of data from said device, each data access request from said device including data identifying a slot of said device cache in which the cache line will be stored; and
responsive to receiving each said data access request from said device, updating said cache line state directory structure by writing cache line identifying information corresponding to the data access request at the entry corresponding to the slot in which the cache line requested by the data access request will be stored.

12. The method of claim 9, wherein said step of maintaining a cache line state directory structure comprises maintaining a first portion of said cache line state directory structure corresponding to said device cache, and a second portion of said cache line state directory structure corresponding to a plurality of caches associated with a plurality of processors, said method further comprising the steps of:
- responsive to each of said plurality of data access requests, accessing said cache line state directory structure to determine whether data having a data address referenced by the request is contained in any of said plurality of processors;
- for each of said plurality of data access requests, determining whether to send an invalidation message to any of said plurality of processors based on whether said step of accessing said cache line state directory structure determines that data having a data address referenced by the request is contained in any of said plurality of processors; and
- for each of said plurality of data access requests, sending an invalidation message to at least one of said plurality of processors responsive to the determination made by said step of determining whether to send an invalidation message to any of said plurality of processors.

13. The method of claim 9, wherein said digital data processing system comprises a plurality of nodes, each node containing at least one processor, a respective portion of said memory, and a respective portion of said cache coherency mechanism.

14. A cache coherency apparatus for a digital data processing system:
- a communications interface for communicating with a plurality of devices;
- a cache line state directory structure, wherein at least a portion of said cache line state directory structure corresponds to a cache having exactly N slots for caching data in a first device of said plurality of devices, wherein N is a fixed number greater than one, said at least a portion containing exactly N cache line entries, each entry having a fixed correspondence to a unique respective one of said N slots for caching data of said cache in said first device; and
- cache coherence control logic which selectively generates invalidation messages responsive to events affecting the validity of cached data, said cache coherence control logic determining whether to send cache line invalidation messages to said first device using state information in said at least a portion of said cache line state directory structure corresponding to said cache in said first device.

15. The cache coherency apparatus of claim 14, wherein said first device is an I/O bridge device.

16. The cache coherency apparatus of claim 14, wherein said cache line state directory structure contains a plurality of discrete portions, including a first portion corresponding to said cache in said first device, and a second portion corresponding to at least one cache associated with a processor, said second portion containing a plurality of cache line entries, each entry having a fixed correspondence to a respective set of real addresses, said cache coherence control logic further selectively determining whether to send cache line invalidation messages to said processor using state information in said second portion of said cache line state directory structure.

17. The cache coherency apparatus of claim 14, wherein said cache coherency apparatus is embodied in a single integrated circuit chip, said integrated circuit chip being separate from said first device.

* * * * *